(12) United States Patent
Schuld et al.

(10) Patent No.: US 9,731,478 B2
(45) Date of Patent: Aug. 15, 2017

(54) DECHLORINATING HUMIDIFIER FILTER WICK

(71) Applicant: RPS Products, Inc., Hampshire, IL (US)

(72) Inventors: Daniel E. Schuld, Inverness, IL (US); Curt Weber, Barrington, IL (US); Donald N. Jursich, Crystal Lake, IL (US)

(73) Assignee: RPS Products, Inc., Hampshire, IL (US)

( * ) Notice: Subject to any disclaimer, the term of this patent is extended or adjusted under 35 U.S.C. 154(b) by 63 days.

(21) Appl. No.: 14/870,939

(22) Filed: Sep. 30, 2015

(65) Prior Publication Data

US 2016/0089653 A1 Mar. 31, 2016

Related U.S. Application Data (60) Provisional application No. 62/057,582, filed on Sep. 30, 2014.

(51) Int. Cl.
| | |
|---|---|
| *B01F 3/04* | (2006.01) |
| *B32B 15/01* | (2006.01) |
| *B32B 37/14* | (2006.01) |
| *B32B 37/18* | (2006.01) |
| *B32B 38/00* | (2006.01) |
| *B32B 38/04* | (2006.01) |

(52) U.S. Cl.
CPC ........ *B32B 15/016* (2013.01); *B01F 3/04085* (2013.01); *B32B 37/144* (2013.01); *B32B 37/18* (2013.01); *B32B 2038/0028* (2013.01); *B32B 2038/045* (2013.01); *B32B 2307/728* (2013.01)

(58) Field of Classification Search
CPC .............................. B01F 3/04; B01F 3/04085
USPC .................................................. 261/101, 104
See application file for complete search history.

(56) References Cited

U.S. PATENT DOCUMENTS

| | | |
|---|---|---|
| 5,374,381 A | 12/1994 | Schuld et al. |
| 5,407,604 A | 4/1995 | Luffman |
| 6,053,482 A | 4/2000 | Glenn et al. |
| 6,568,662 B2 * | 5/2003 | Schuld .................... F24F 6/043 261/100 |
| 6,814,306 B1 | 11/2004 | Okubo |
| 6,886,814 B1 | 5/2005 | Schuld |
| 7,066,452 B2 | 6/2006 | Rotering et al. |
| 2008/0011656 A1 | 1/2008 | Lacy et al. |
| 2012/0234166 A1 | 9/2012 | Markham et al. |

* cited by examiner

*Primary Examiner* — Robert A Hopkins
(74) *Attorney, Agent, or Firm* — Greer, Burns & Crain, Ltd.

(57) ABSTRACT

An evaporative element for use in a humidifier. In order to reduce the amount of chloride species evaporated into the air with the water, the evaporate element includes a dechlorination agent, such as sulfur compounds, ascorbic acid, sodium ascorbate, or combinations thereof. The dechlorination agent can be applied to the water retaining elements of the evaporate element or to the rigid members used to support the water retaining elements.

20 Claims, 5 Drawing Sheets

DECHLORINATING HUMIDIFIER FILTER WICK

CROSS-REFERENCES TO RELATED APPLICATIONS

This application claims priority to U.S. Provisional Application No. 62/057,582, filed on Sep. 30, 2014, the entirety of which is incorporated herein by reference.

FIELD OF THE INVENTION

The present invention relates to filter wicks for evaporative humidifiers, particularly portable humidifier units and humidifiers for hot air furnaces and heating systems. More specifically, the instant filter wick for evaporative humidifier neutralizes or otherwise removes unwanted chlorine species in the water wicked through the filter wick and evaporated into the air by the humidifier.

BACKGROUND OF THE INVENTION

Use of forced air systems for home heating is well known. A network of ducts is used to carry warm air throughout the home and to return cool air to the furnace for reheating. Since cool air holds less moisture than warm air, household air that comes in contact with cool surfaces, such as windows, tends to condense some of the moisture, leaving the air dry. Dry air allows static electricity to build up, causing the familiar spark when people or pets touch conductive surfaces. If the dryness continues, moisture is drawn into the air from the skin and mucous membranes of the inhabitants or from wood products.

Adding moisture to the air with a humidifier is a well-known method of preventing dry skin, cracking and drying of furniture, as well as making the environment more comfortable. Many types of humidifiers are known, including portable humidifier units and humidifiers that are mounted to hot air furnaces.

Humidifiers for hot air furnaces and space heating systems are typically comprised of a housing having an air inlet and an air outlet for passing space heating air from the furnace through the housing and over and/or through a water fed filter wick in the housing for moistening the heating air passing through the housing and to the space heating system. Portable humidifier units operate substantially the same way using a fan to draw the air through the moistened filter wick and the humidified air being emitted directly to the ambient. In a typical humidifier, water for absorption by the filter wick is held in a reservoir that rests on the base of the humidifier housing. The structure, mode of operation, and beneficial effects of both hot air furnace humidifiers and portable units are well known.

With evaporative humidifiers, if there are any impurities in the water, the contents of the water are wicked up and evaporated along into the air with the water. For example, many municipalities use chlorine to treat the drinking water. The addition of chlorine to disinfect water may be accomplished by chlorine gas ($Cl_2$), sodium hypochlorite solution (NaOCl), chloramine ($NH_2Cl$), or calcium hypochlorite, ($Ca(OCl)_2$). If the treated water is used in the reservoir of the humidifier, the various chlorine species used to treat the water, or byproducts of the chlorine species, such as hypochlorous acid (HOCl), will be carried in the humidified air as it is evaporated into the air with the water. For this reason, it is often recommended to use distilled water in humidifiers. However, it is often inconvenient and more expensive to use distilled water in humidifiers.

Therefore there remains a need for a more convenient way to obtain the benefits of the evaporative humidifiers without evaporating the chlorine species into the air with the water vapor.

SUMMARY OF THE INVENTION

A new filter wick material has been invented in which one or more dechlorination agents are incorporated with the materials of the filter wick.

In one aspect of the present invention, the present invention provides an evaporative element for a humidifier or the like comprising a plurality of stacked layers of a water retaining material capable of absorbing water and evaporating water. At least one layer of water retaining material includes an effective amount of a dechlorination agent.

In a second aspect of the present invention, the present invention provides an evaporative element for a humidifier or the like comprising a plurality of stacked layers of a water retaining material capable of absorbing water and evaporating water, at least one layer of substantially rigid material adjacent to at least one of said the stacked layers of water retaining material for supporting said stacked layers, and an adhesive for bonding the stacked layers together and, preferably, for bonding the at least one layer of substantially rigid material to the stacked layers. At least one layer of water retaining material includes an effective amount of a dechlorination agent.

In some embodiments of the present invention, the dechlorination agent is selected from the group consisting of: sulfur compounds; ascorbic acid; sodium ascorbate; or, combinations thereof.

In at least one embodiment of the present invention, the water retaining material comprises slit and expanded wicking paper. Each layer of slit and expanded wicking paper may comprise a lattice of bridges and strings defining a multiplicity of openings. At least a portion of said layers of wicking paper is staggered in relation to adjacent layers of wicking paper such that the openings in the respective adjacent layers are staggered in relation to each other.

In one or more embodiments of the present invention, said plurality of layers of water retaining material comprises a first layer of wicking paper having bridges and strings defining said openings in said first layer and a second layer of wicking paper have bridges and strings defining said openings in said second layer. The openings of said first layer are substantially smaller than the openings in said second layer.

In various embodiments of the present invention, said plurality of layers of wicking paper comprises alternating first and second layers.

In some embodiments of the present invention, the least one layer of substantially rigid material further comprises a dechlorination agent selected from the group consisting of: sulfur compounds; ascorbic acid; sodium ascorbate; or combinations thereof.

In one or more embodiments of the present invention, the evaporative element further comprises a plurality of layers of substantially rigid material. At least one layer of water retaining material may be sandwiched in between layers of substantially rigid material.

In at least one embodiment of the present invention, the at least one layer of substantially rigid material comprises a layer of slit and expanded metal and/or rigid material.

In some embodiments of the present invention, the at least one layer of substantially rigid material may be sandwiched between said layers of water retaining material.

In many of the embodiments of the present invention, the at least one layer of substantially rigid material comprises a slit and expanded metal lattice of bridges and strings forming openings there between. Said openings comprise the perforations in said substantially rigid material, said bridges being about ⅛ inch wide, and said openings being about ½ inch long by about ¼ inch wide.

In at least one embodiment of the present invention, said water retaining material has a Frazier permeability of at least 30 cfm/ft².

In one or more embodiments of the present invention, said water retaining material has a capillary rise of at least 79 millimeters per minute.

In a third aspect of the present invention, the present invention provides an evaporative element for a humidifier comprising: a plurality of layers of slit and expanded wicking paper, each said layer having a lattice of bridges and strings defining openings therein, the layers of wicking paper being stacked one to the other, the openings in each layer being staggered in relation to adjoining layers, said wicking paper having a capillary rise of at least 79 mm per minute; at least one layer of slit and expanded rigid material sandwiched between said multiplicity of layers of slit and expanded wicking paper; and, an adhesive for holding together said layers of wicking paper and said layer of slit and expanded rigid material. At least one layer of slit and expanded wicking paper, at least one layer of slit and expanded rigid material, or both includes a dechlorination agent selected from the group consisting of: sulfur compounds; ascorbic acid; sodium ascorbate; or combinations thereof.

In at least one embodiment of the present invention, the evaporated element further includes a plurality of layers of slit and expanded rigid material. At least one of said layers of wicking paper may be sandwiched between said plural layers of slit and expanded rigid material.

In yet another aspect of the present invention, the invention provides a wicking element which comprises: a plurality of stacked layers of slit and expanded wicking paper; at least one layer of slit and expanded metal sandwiched between said layers of wicking paper; and, a dechlorination agent selected from the group consisting of: sulfur compounds; ascorbic acid; sodium ascorbate; or, combinations thereof.

In still another aspect of the present invention, the invention provides a process of making a humidifier wicking element by: incorporating a dechlorination agent onto at least one sheet of water retaining element, at least one layer of a rigid support member, or both; slitting and expanding a plurality of sheets of water retaining element; stacking the plurality of sheets of water retaining element; slitting and expanding at least one layer of a rigid support member; disposing the least one layer of a rigid support member adjacent to the stacked sheets of water retaining element; and, laminating the least one layer of a rigid support member and stacked sheets of water retaining element together into a composite wicking element. The composite wicking element includes the at least one sheet of water retaining element with the dechlorination agent, the at least one layer of a rigid support member with the dechlorination agent, or both.

In at least one embodiment of the present invention, an adhesive is used in laminating the sheets and rigid material together.

In various embodiments of the present invention, the composite wicking element comprises a plurality of layers of rigid material which are slit and expanded.

In one or more embodiments of the present invention, at least one layer of the slit and water retaining element is sandwiched between two layers of rigid material.

BRIEF DESCRIPTION OF THE DRAWINGS

The drawings are merely exemplary of one or more embodiments of the present invention in which.

DETAILED DESCRIPTION OF THE INVENTION

As mentioned above, a new evaporative element for a humidifier or the like has been invented in which one or more dechlorination agents is incorporated with the materials of the evaporative element. The dechlorination agents will reduce the amount of undesirable chlorine species such as, hypochlorous acid or chloramine, in the water evaporated in the air. Preferred dechlorination agents include ascorbic acid, ascorbate salts, such as sodium ascorbate, or sulfur compounds, for example, sulfite salts or bisulfite salts, such as sodium sulfite or sodium bisulfite. Additionally, the dechlorination agents can be an adsorbent or molecular sieve like activated carbon.

With respect to ascorbic acid, it is believed that approximately one gram of ascorbic acid will neutralize one milligram per liter of chlorine per 100 gallons of water. The reaction proceeds very fast and is shown below:

$$C_5H_5O_5CH_2OH + HOCl \rightarrow C_5H_3O_5CH_2OH + H^+ + Cl^- + H_2O$$

It is believed that approximately 2.5 parts of ascorbic acid are required for neutralizing 1 part chlorine. Since ascorbic acid is weakly acidic, the pH of the treated water may decrease slightly in low alkaline waters. After reducing chlorine content below detectable levels, the water should be acceptable for use in household humidification.

Additionally, ascorbate salts, such as sodium ascorbate, can also be used to neutralize chlorine. Unlike the ascorbic acid, sodium ascorbate is pH neutral and will not affect the pH of the treated water as much as ascorbic acid. Sodium ascorbate is preferable for neutralizing high concentrations of chlorine by the reaction shown below:

$$C_5H_5O_5CH_2ONa + HOCl \rightarrow C_5H_3O_5CH_2OH + Na^+ + Cl^- + H_2O$$

It is believed that approximately 2.8 parts of sodium ascorbate are required to neutralize 1 part chlorine. After reducing chlorine content below detectable levels, the water should be acceptable for use in household humidification.

With either ascorbic acid or sodium ascorbate, a weak acid called dehydroascorbic acid forms which can lower the pH of the treated water.

Sulfur dioxide reacts with rapidly with various chloride containing species, making sulfur dioxide an ideal dechlorination chemical. As is known, sulfur dioxide reacts with water to form hydrogen sulfite ($HSO_3^-$) ions, which in turn react with the free and combined chlorine in the wastewater in the following reactions:

Free Chlorine Reactions (Hypochlorous Acid):

$$SO_2 + H_2O \rightarrow HSO_3^- + H^+$$

$$HOCl + HSO_3^- \rightarrow SO_4^{-2} + Cl^- + 2H^+$$

Combined Reactions (Chloramine):

$$SO_2 + H_2O \rightarrow HSO_3^- + H^+$$

$$NH_2Cl + HSO_3^- + H_2O \rightarrow Cl^- + SO_4^{-2} + NH_4^+ + H^+$$

In the reactions with the hydrogen sulfite, chlorine is converted to chloride ($Cl^-$) ions. While on a mass basis, 0.9 parts sulfur dioxide is required to dechlorinate 1.0 part residual chlorine, it is believed that approximately a one to one ratio is used in practice to ensures that all the chlorinate compounds are reduced to chloride. Sulfur dioxide is a colorless vapor at atmospheric temperature and pressure, but if compressed and cooled, it will form a colorless liquid.

However, sulfur dioxide is a corrosive, nonflammable gas with a pungent odor. Therefore, it is contemplated that instead of sulfur dioxide, one or more sulfur compounds such as sulfite or bisulfite salts, such as sodium sulfite or sodium bisulfite, can be used. The reactions are the same as shown above, with the exception of the reaction of sulfur dioxide with water to produce the sulfite ion.

Finally, as mentioned above, other known dechlorination agents may be used such as a sorbent or a molecular sieve like activated carbon. As is known, these dechlorination agents do not react with the chlorine species to produce more inert species, but rather adsorb the species onto the surfaces of the adsorbent or otherwise remove the species from the water.

In use, the dechlorination agents will react/adsorb with chlorine species in the water within the evaporative element while the water is being absorbed into the wick and wicked throughout for distribution of clean, non-chlorinated water into the air.

With these principles of the present invention in mind, one or more embodiments of the present invention will now be described with the understanding that these embodiments are merely preferred. In the embodiments depicted in the Figures, like elements are given like numerals.

Figure 1:
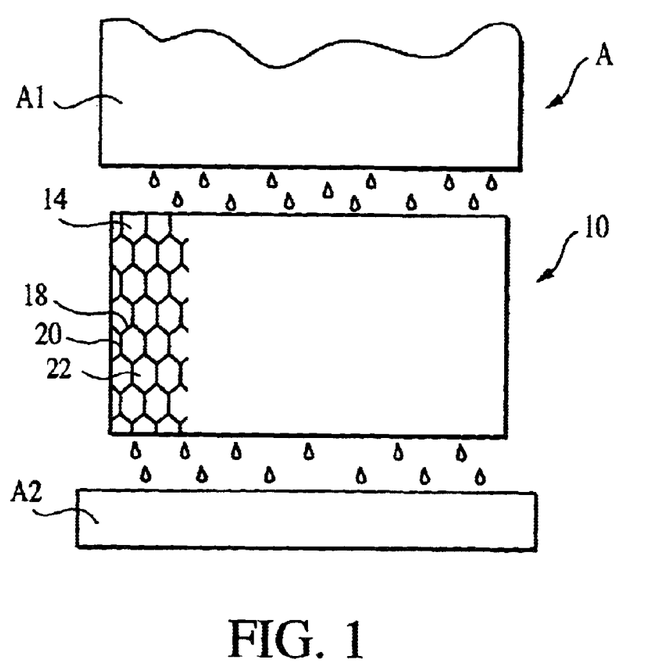
FIG. 1 is a schematic representation of a trickle down type of humidifier.

Referring now to FIG. 1, the invention comprises an adaptable evaporative element, generally designated 10, for a humidifier, generally A, or the like. The humidifier A is shown diagrammatically as comprising a water source A1 and a water collection pan A2. Water is directed from source A1 through the evaporative element 10 and is collected for recirculation in pan A2. Air is preferably directed by a fan, blower or other means (not shown) through element 10 in a general direction normal to the surface of the drawing. The trickle down type of humidifier A is merely shown as one example of a use for the evaporative element 10 of the invention. The evaporative element 10 of the invention may be used in other types of humidifiers, including, but not limited to wick-up types where the element is partially immersed in a water bath, or rotary types where the evaporative element is partially immersed in a bath and rotated. Additionally, the element 10 of the invention may be used in evaporative coolers.

Figure 2:
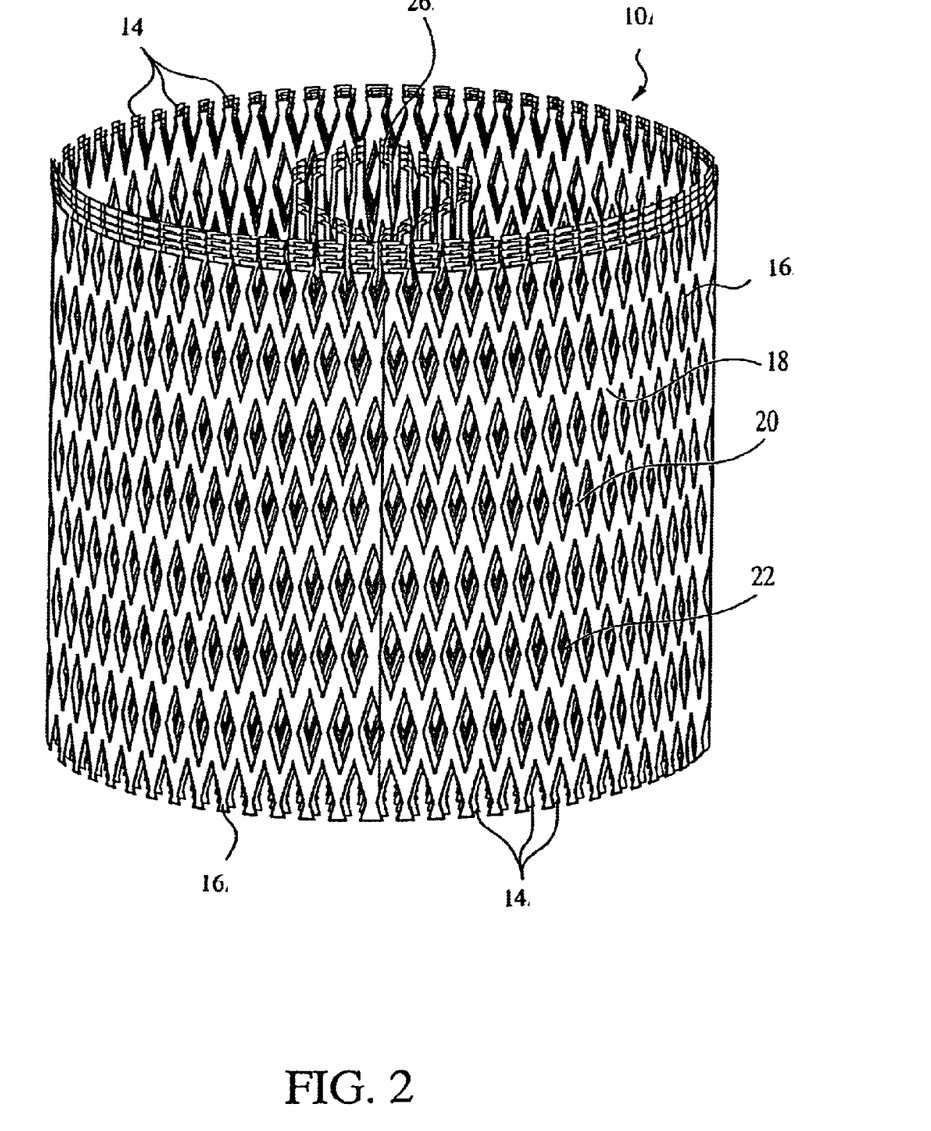
FIG. 2 is perspective drawing of a first embodiment of the evaporate element according to the present invention.

Referring to FIG. 2, the evaporative element, generally designated 10, includes a plurality of stacked layers of a water retaining media 14 and, preferably also includes at least one layer of a substantially rigid material 16. The rigidity of the rigid material 16 is in relation to the water retaining media 14, and it is preferred that the substantially rigid material 16 is perforated and malleable. It is most preferred that both the water retaining media 14 and the perforated, substantially rigid material 16 are preferably made of slit and expanded construction. This construction is known in the art for making evaporative elements for humidifiers, as taught in U.S. Pat. No. 5,374,381, U.S. Pat. No. 6,568,662, and U.S. Pat. No. 6,886,814, all of wherein incorporated by reference.

This and other embodiments of this invention all utilize the water retaining media 14 to facilitate air-water contact. The water retaining media 14 includes any substance that is air permeable and will hold sufficient water to provide suitable evaporation. Water absorbent materials, such as paper or spongy fabrics are preferred, but non-absorbent materials may be used if sufficient water is held on the surface of the material to provide suitable contact between the air and water.

Wicking paper is the most preferred water retaining media 14 in this embodiment. The term "wicking paper" is intended herein to mean blotter type papers having superior capillary rise properties. Wicking paper has an exceptional ability to absorb water. It provides a constant supply of water at its surface due to capillary action. As the water evaporates and becomes airborne, the water at the surface of the media 14 is quickly replaced by water being sucked up through the pores of the paper. It also acts to easily distribute water that is distributed to the media 14. If a portion of the paper is immersed in water or in the water path of a trickle down type humidifier, capillary action will also tend to wick away a portion of the water to nearby pores that contain less water. In this embodiment, the resiliency of the paper media 14 tends to expand the media in the unfolded configuration because it tends to decompress itself. This improves the surface area and the ability of the media to hold water compared to the compressed state.

Applicant has discovered that Ahlstrom Filtration grade No. 939-39 paper made by Ahlstrom Filtration, Inc., Mt. Holly Springs, Pa. 17065, is an excellent wicking paper for fabrication of the evaporative element of the invention. The Ahlstrom paper is 97-100% cellulose fiber with a trace of polyamide wet strength resin. The paper has a basis weight of 37-41 lbs. per ream (20 in.×20 in.×500 sheets), with a thickness of 0.026 to 0.036 inches and a wet burst is 150" $H_2O$ min. The Frazier permeability of the Ahlstrom paper is 30 to 40 cm/ft². Most importantly, the Ahlstrom grade No. 939-39 paper has a capillary rise ability of 79 to 112 mm/min. The excellent capillary rise ability of the paper greatly enhances the spreading of water throughout the evaporative element, which improves the evaporative rate.

Multiple layers of thin aluminum foil may be used as the water retaining media 14, if the surface is coated to prevent rapid runoff of the water. Such coatings are well known in the art, for example U.S. Pat. No. 2,955,064, herein incorporated by reference, and are generally based on ceramic or clay compositions. Any coating that provides sufficient water retention properties is suitable for use with this invention. Use of coated foil as the water retaining media 14 produces a longer lasting cartridge because the foil retains its shape longer and is less subject to deterioration than paper media.

The preferred substantially rigid material layer 16 is a metal. This rigid layer 16 is juxtaposed to at least one of the layers of water retaining media 14 and is suitably rigid to provide structural support to the media layers, and suitably malleable to hold the stacked media layers in either a pre-folded or an unfolded configuration. Exact thickness of the rigid layer 16 must be determined by the shape and size of the evaporative element 10 that is formed and the number of rigid material layers 16 to be used, but generally, relatively thin materials, such as metal foils, are suitable in this application, and are preferred materials. The thickness of this layer 16 should be no greater than needed to be functional in order to minimize the cost of the evaporative element 10. Thickness of about 0.008 inches is preferable for many applications.

Aluminum foil is the most preferred rigid layer 16 because of its lightweight, malleability and corrosion resistance. The foil should be perforated in some manner to allow flow of air through the layer. Other suitable materials for use in the rigid layer 16 include plastics, cardboard or stiff papers. Where slit and expanded construction is used for the substantially rigid layer 16, it is preferred that the bridges 18 be oriented horizontally. In this position, there is a natural inclination for the bridge 18 to catch and divert cascading water.

Where the water retaining media 14 is sufficiently rigid to provide its own structural support, the rigid layer 16 and the water retaining material 14 are optionally the same substance. This occurs, for example, where coated aluminum foil is used as the water retaining media 14. When this occurs, both functions are considered to be performed by a single substance. The rigid material layer 16 is also optionally coated to provide additional water retention.

An adhesive may be used for bonding the layers of media 14, 16 together and for bonding the rigid material layer 16 to the water retaining media layers 14 to form a laminated evaporative element. Any adhesive may be used that does not overly hinder the evaporation function by sealing too much of the water retaining media 14. Hot melt adhesive has been found to be suitable when used to coat only the edges of the adjoining surfaces. Where slit and expanded construction is used, the edges of the bridges 18 and strings 20 are coated, thereby forming a bond with the bridge or string of the adjacent layer.

It is preferable that a single adhesive be used to bond all of the layers to each other, however, the use of two or more adhesives is contemplated and considered to be within the scope of this invention. The choice of the water retaining media 14 and the rigid layer 16 may require that one adhesive be required for bonding the water retaining media layers 14 together, and a different adhesive needed to bond the rigid layer 16 to the water retaining media 14 to form a stack. A third adhesive is optionally used to bond multiple stacks or to attach optional components, such as a filter media 24E, shown in FIG. 6 (discussed in more detail below).

In accordance with the present invention, the evaporative element 10 includes a dechlorination agent. It is preferred, although not required, that at least one layer of the water retaining media 14, the substantially rigid material 16, or both include the dechlorination agent. The dechlorination agent can be applied by, for example, soaking the substantially rigid material 16 in a slurry of dechlorination agent, then allowing the soaked substantially rigid material 16 to dry. Other methods for incorporating the dechlorination agent include spraying or soaking the dechlorination agent onto the water retaining media 14 or the substantially rigid material 16 and then drying the water retaining media 14 or the substantially rigid material 16. Other known methods of applying or incorporating such materials into the evaporative element 10 may be used. As mentioned above, due to the presence of the dechlorination agent, the chlorine species in the water will react to form a more desirable and more benign chlorine species, or may be adsorbed by or otherwise retained on the dechlorination agent. In either case, the amount of undesirable chlorine species passed into the evaporative air is less.

Figure 3:
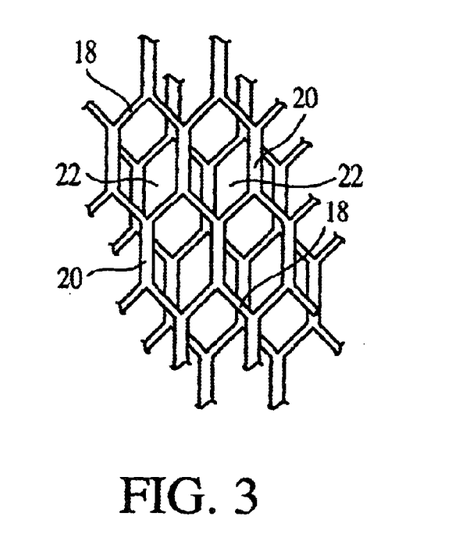
FIG. 3 is a detailed plan view of a portion of the evaporate element shown in FIG. 2.

As shown best in FIG. 3, when the materials 14, 16 are slit and expanded, a lattice is formed of bridges 18 and strings 20 defining openings 22 therein. It is desirable to stagger the openings 22 in adjacent layers to expose a greater surface area of the materials to the air flow. Generally, the air flows normally to the layers shown, although the air can flow with a tortuous path around the strings 20 and bridges 18 to various openings 22 at each layer. This flow pattern brings the air in contact with more water at the surface of the evaporative element 10. Conventional machinery for slitting and expanding materials is preferably used, resulting in an economical manufacturing process. For example, one effective slit and expanded material has slits ⅝ inches long at ¼ inch spacing, having bridges ⅛ inch in length, strings ¼ inch in length to produce openings 9/16×¼ inches.

Returning to FIG. 2, as can be seen, the evaporative element 10 comprises a cylindrical evaporative element 10 having a folded diameter 10 and ¾ inches that can be expanded.

Figure 4:
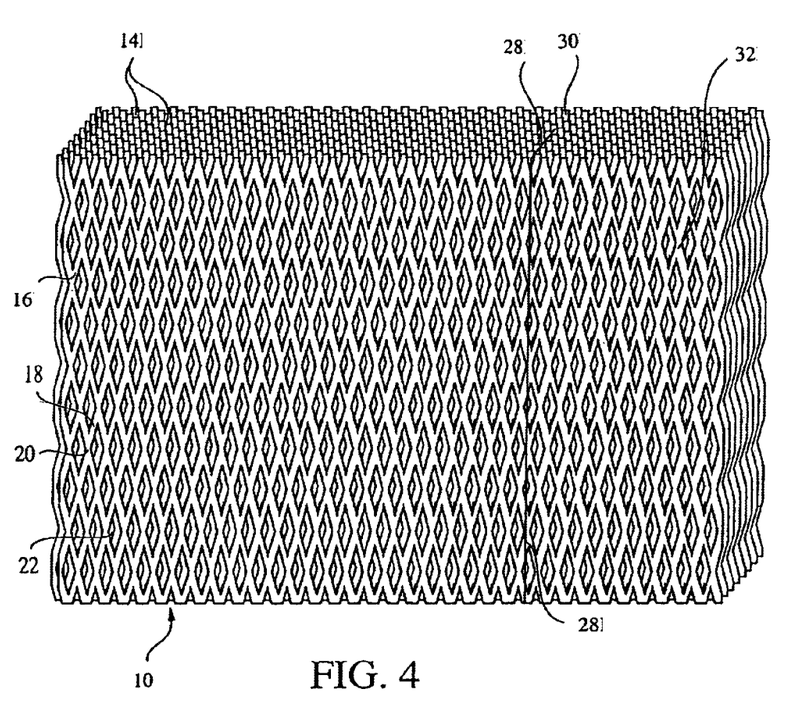
FIG. 4 is a perspective drawing of another embodiment of the evaporate element according to the present invention.

Referring now to FIG. 4, another embodiment of an evaporative element 10 of the present invention is shown in which the evaporate element 10 has a rectangular shape. Other shapes are contemplated. The size and shape of the evaporative element 10 may be adapted by means of a slit 28 that extends through a sufficient portion of the evaporative element to form a hinge 30 and a separable segment 32 that is easily detached without the use of tools.

Figure 5:
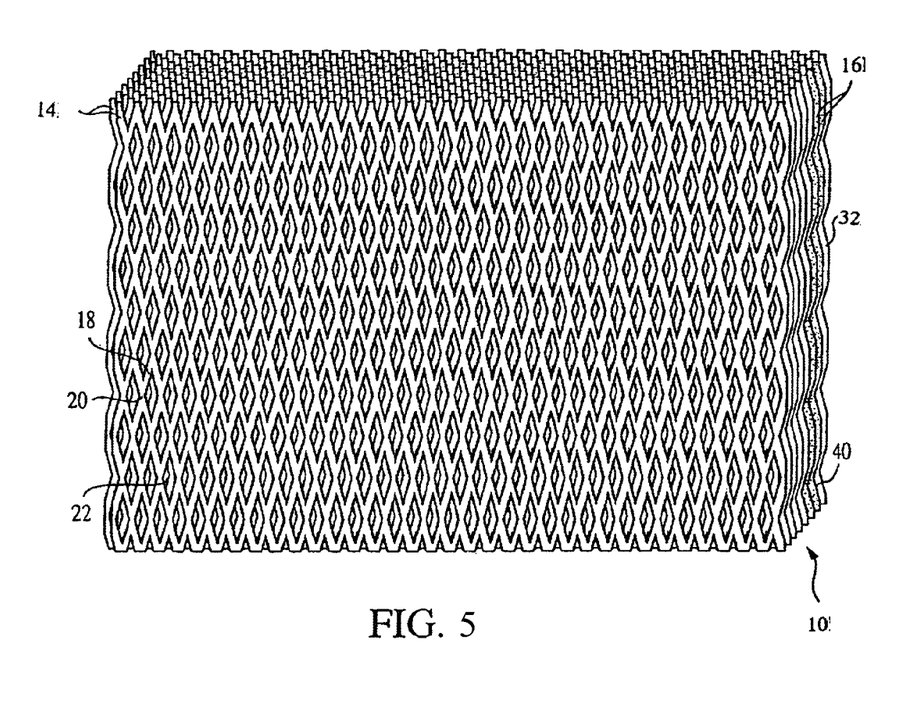
FIG. 5 is a perspective drawing of yet another embodiment of the evaporate element according to the present invention; and, FIG. 6 is a perspective drawing of still another embodiment of the evaporate element according to the present invention.

FIG. 5 shows a still another embodiment of this invention, wherein the evaporative element 10 is adaptable between layers rather than across layers. The evaporative element 10 includes stacked layers of the water retaining media 14, divided into at least two portions. Each portion contains a plurality of layers 14 that are bonded to each other to form a laminated unit. The evaporative element 10 also includes at least two rigid layers 16 that are juxtaposed to each other and separably bonded together. At least one laminated unit of the water retaining media 14 is positioned on either side of the rigid layers 16, sandwiching the rigid layers between the multiple layers of water retaining media.

Use of two or more rigid layers 16 ensures that there is a support layer on the evaporative element 10 after being adapted. Preferably, the rigid material 16 is metal, plastic, stiff paper or cardboard, but it can be any material that provides support to the water retaining media 14 and is strong enough to hold together during the process of pulling apart the layers during adaptation.

The relative amounts of water retaining media 14 on each side of the rigid material layers 16 determine the thickness of the adapted evaporative element 10 relative to the separable layers 32. If the number of layers of water retaining media 14 in the laminated unit on each side are the same, identical adapted evaporative elements 10 are formed, each of which can be used in the humidifier.

Preferably, two adhesives are used, a first adhesive to allow the layers to easily separate between the rigid material layers 16, and a second adhesive to maintain strength between other water retaining layers 14 and between each rigid layer 16 and the adjacent water retaining layer 14. The suitable first adhesive bond is strong enough to hold the evaporative element 10 together before separation, but separates without the use of tools when the rigid layers 16 are pulled apart.

Figure 6:
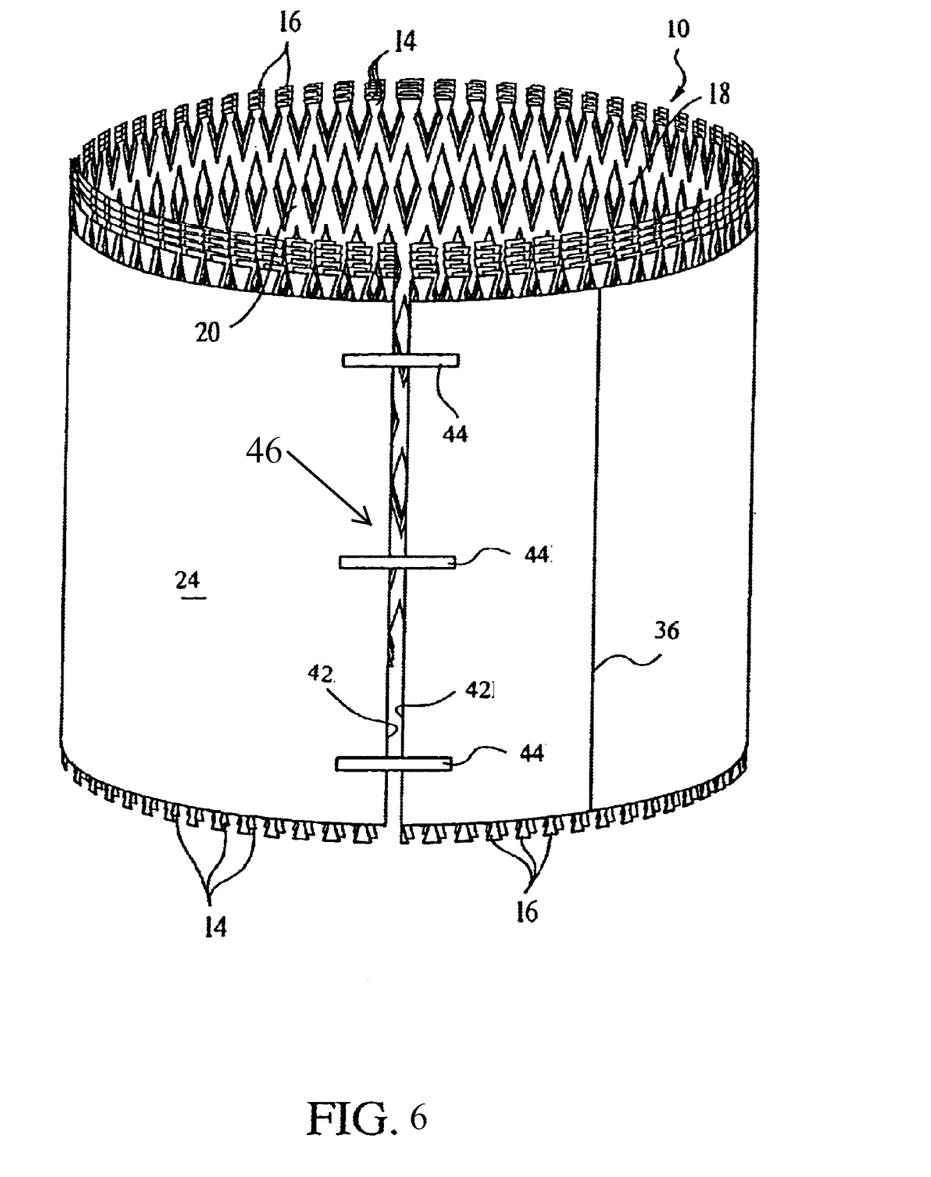

In a yet another embodiment of this invention, shown in FIG. 6, a cylindrical evaporative element 10 is formed in which ends 42 of the evaporative materials 14, 16 are abutted to each other and secured, forming the cylindrical evaporative element 10.

The evaporative element in FIG. 6 also includes a filter media 24 that provides air-filtering capacity. The filter media 24 comprises a water-insoluble, porous material, such as a synthetic media. Preferred filter media 24 include polymers or co-polymers, spun polymers, foams, twisted, non-woven and microporous webs. The synthetic media is preferably made from one or more fibers such as acrylic, nylon, rayon, vinyl, polyolefin, polyester, polyethylene or polypropylene fibers. The exact thickness of the filter media 24 depends upon the material used, its porosity and the desired degree of filtration, however, a preferred thickness is in the range of from about 0.01 inches to about 1 inch. It is also preferred that the filter media 24 be cuttable for use in embodiments where the evaporative element 10 is cut to a specific size.

The filter media 24 should be positioned so that it is upstream of the evaporative element 10. If the filter media 24 is downstream of the evaporative element 10, the water vapor that entered the air may redeposit on the filter media 24 instead of remaining airborne to humidify the living area. In addition, the presence of particulates in the air to be humidified may provide nuclei for condensation of the water vapor, causing it to condense and little on surfaces shortly after exiting the evaporative element 10. Humidification efficacy is maximized where particulates are filtered before the aid contacts the evaporative element 10. Thus, the filter media 24 is preferably placed on the exterior, that is, on the side of the evaporative element 10 closest to where external air is brought into contact with the evaporative element 10.

It is also preferred that the filter media 24 be treated with an anti-microbial agent to resist growth of mold, mildew, fungus, and bacteria. The anti-bacterial agent may be applied by any method known in the art, such as by treatment of the fibers prior to formation of the synthetic media or by dipping of the synthetic media.

In order to attach the filter material 24 to the evaporative element 10 one or more fasteners 44 may be used. The preferred fastener 44 is part of a hook and loop type fastener, such as those sold under the VELCRO® name, however, any fasteners 44 that adhere to the evaporative element 10 in any way are useful. Additional examples of suitable fasteners 44 include clamps, clips and reusable adhesives, including tapes, or a rigid structure comprising, for example, a bar with a protrusion at each end, resembling a large staple.

The use of the optional filter media 24 that is attachable to the hook portion of hook and loop fasteners 44 is particularly useful in this embodiment of the invention. Most preferably, the fastener 44 is the hook portion of the hook and loop fastener system. The material selected as the air filter media 24 advantageously functions as a loop portion 46 of the hook and loop fastener 44. When the entire air filter media 24 receives the hooked fastener 44, the fastener 44 is removably placeable anywhere on the filter media 24. Placement of the loop portion 46 need not be predetermined. Non-woven, synthetic fabrics, such as spun polypropylene or spun polyester are useful air filter media 24 that also act as the loop portion 46 of hook and loop fastener 44.

In all of these and other embodiments of the present invention, the use of an evaporate element with a dechlorination agent allows for water to be evaporated into the air, while reducing the amount of undesirable chlorine containing species evaporated into the air with the water. After a certain amount of time, when the dechlorination agent has become saturated or been consumed, the evaporate element can be removed and a new one with fresh dechlorination agent used.

While a particular embodiment of the apparatus and method for humidifying air has been shown and described, it will be appreciated by those skilled in the art that changes and modifications may be made thereto without departing from the invention in its broader aspects and as set forth in the following claims.

What is claimed is:

1. An evaporative element for a humidifier comprising:
   a plurality of stacked layers of a water retaining material capable of absorbing water and evaporating water;
   at least one layer of substantially rigid material adjacent to at least one of said the stacked layers of water retaining material for supporting said stacked layers; and,
   an adhesive for bonding the stacked layers together, for bonding the at least one layer of substantially rigid material to the stacked layers, or for both,
   wherein at least one layer of water retaining material includes a dechlorination agent.

2. The evaporative element of claim 1 wherein the dechlorination agent is selected from the group consisting of: sulfur compounds; ascorbic acid; sodium ascorbate; or combinations thereof.

3. The evaporative element of claim 1, wherein the water retaining material comprises slit and expanded wicking paper, and wherein each layer of slit and expanded wicking paper comprises a lattice of bridges and strings defining a multiplicity of openings, and at least a portion of said layers of wicking paper being staggered in relation to adjacent layers of wicking paper such that the openings in the respective adjacent layers are staggered in relation to each other.

4. The evaporative element of claim 1, wherein said plurality of layers of water retaining material comprises a first layer of wicking paper having bridges and strings defining said openings in said first layer and a second layer of wicking paper have bridges and strings defining said openings in said second layer, and wherein the openings of said first layer are substantially smaller than the openings in said second layer.

5. The evaporative element of claim 4, wherein said plurality of layers of wicking paper comprises alternating first and second layers.

6. The evaporative element of claim 1, wherein the least one layer of substantially rigid material further comprises a dechlorination agent that is selected from the group consisting of: sulfur compounds; ascorbic acid; sodium ascorbate; or combinations thereof.

7. The evaporative element of claim 1, further comprising: a plurality of layers of substantially rigid material, and wherein at least one layer of water retaining material being sandwiched in between layers of substantially rigid material.

8. The evaporative element of claim 1, wherein the at least one layer of substantially rigid material comprises a layer of slit and expanded metal.

9. The evaporative element of claim 1, wherein the at least one layer of substantially rigid material is sandwiched between said layers of water retaining material.

10. The evaporative element of claim 1, wherein the at least one layer of substantially rigid material comprises a slit and expanded metal lattice of bridges and strings forming openings there between, said openings comprising the perforations in said substantially rigid material, said bridges being about 1/8 inch wide, and said openings being about 1/2 inch long by about 1/4 inch wide.

11. The evaporative element of claim 1, wherein said water retaining material has a Frazier permeability of at least 30 $cfm/ft^2$.

12. The evaporative element of claim 1, wherein said water retaining material has a capillary rise of at least 79 millimeters per minute.

13. An evaporative element for a humidifier comprising:
a plurality of stacked layers of a water retaining material capable of absorbing water and evaporating water, the water retaining material comprising slit and expanded wicking paper,
wherein at least one layer of water retaining material includes a dechlorination agent.

14. The evaporative element of claim 13 further comprising:
at least one layer of rigid material.

15. The evaporative element of claim 13 further comprising:
at least one layer of slit and expanded metal sandwiched between said layers of wicking paper.

16. A process of making a humidifier wicking element comprising:
incorporating a dechlorination agent onto at least one sheet of water retaining element, at least one layer of a rigid support member, or both;
slitting and expanding a plurality of sheets of water retaining element;
stacking the plurality of sheets of water retaining element;
slitting and expanding at least one layer of a rigid support member;
disposing the least one layer of a rigid support member adjacent to the stacked sheets of water retaining element; and,
laminating the least one layer of a rigid support member and stacked sheets of water retaining element together into a composite wicking element,
wherein the composite wicking element includes the sheet of water retaining element with the dechlorination agent, the layer of a rigid support member with the dechlorination agent, or both.

17. The process of claim 16, wherein an adhesive is used in laminating the sheets and rigid material together.

18. The process of claim 16, wherein the composite wicking element comprises a plurality of layers of rigid material which are slit and expanded.

19. The process of claim 18 wherein at least one layer of the slit and water retaining element is sandwiched between two layers of rigid material.

20. The process of claim 16 wherein incorporating a dechlorination agent onto at least one sheet of water retaining element, at least one layer of a rigid support member, or both comprises:
applying the dechlorination agent to the at least one sheet of water retaining element, at least one layer of a rigid support member, or both; and,
drying the at least one sheet of water retaining element, at least one layer of a rigid support member, or both after the dechlorination agent has been applied.

* * * * *